Feb. 13, 1951      W. R. LAZENBY      2,541,771
ANIMAL TRAP
Filed March 26, 1947      3 Sheets-Sheet 1
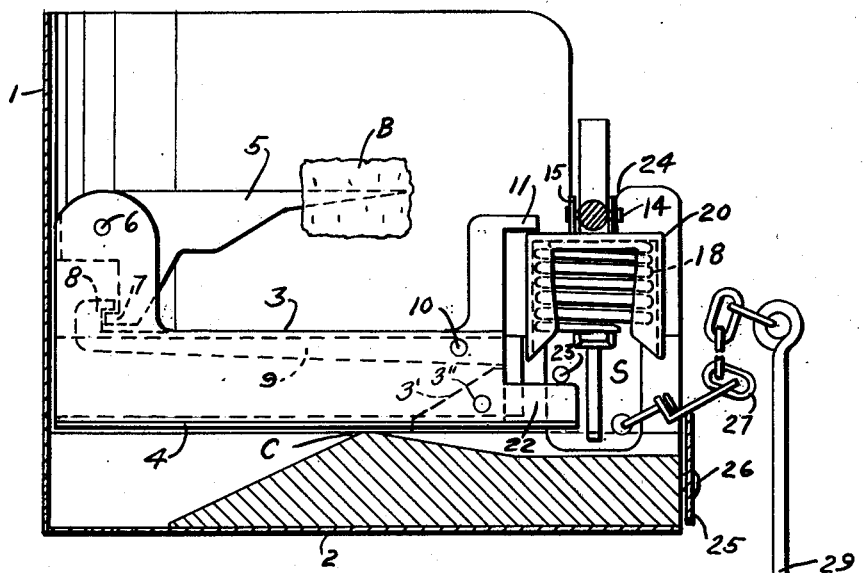
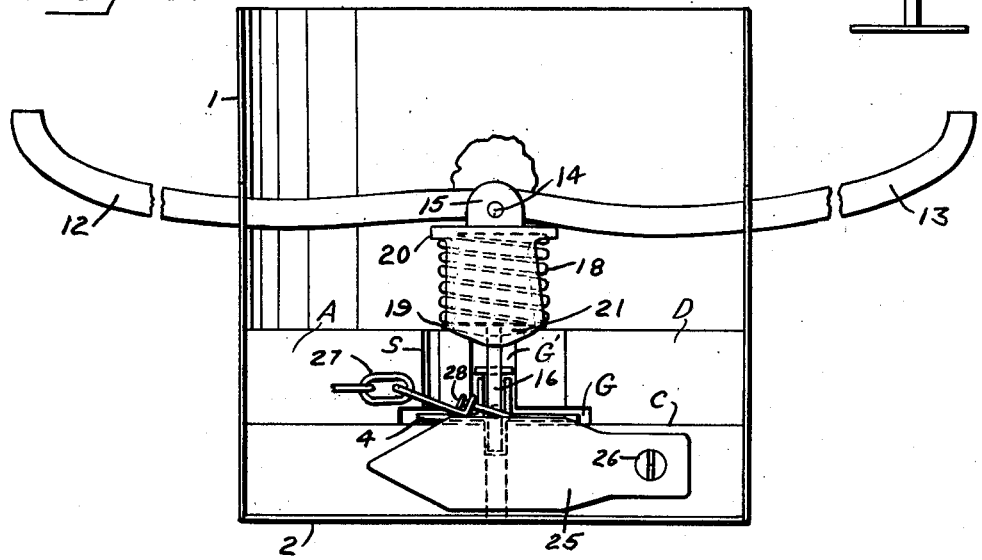
INVENTOR.
William R. Lazenby
BY *Victor J. Evans & Co.*
ATTORNEYS Feb. 13, 1951 W. R. LAZENBY 2,541,771
ANIMAL TRAP
Filed March 26, 1947 3 Sheets-Sheet 2

INVENTOR.
William R. Lazenby
BY Victor J. Evans & Co.
ATTORNEYS

Feb. 13, 1951 W. R. LAZENBY 2,541,771
ANIMAL TRAP
Filed March 26, 1947 3 Sheets-Sheet 3

INVENTOR.
William R. Lazenby
BY Victor J. Evans & Co.
ATTORNEYS

Patented Feb. 13, 1951

2,541,771

UNITED STATES PATENT OFFICE 2,541,771

ANIMAL TRAP

William R. Lazenby, Worland, Wyo.

Application March 26, 1947, Serial No. 737,333

3 Claims. (Cl. 43—88)

My present invention relates to the class of implements for trapping animals, and more specifically to an animal trap that is designed for imprisoning the victim, as by a shackle about the neck, in order that the animal may be brought back alive and without harm. While the trap is adapted for use in trapping various animals, it is especially effective in trapping rabbits, and therefore, for convenience in describing and illustrating the construction and operation of the trap I have referred to a rabbit as the imprisoned victim, and of course, the trap may with convenience be manipulated to free the victim for further attention and disposal by the trapper.

In carrying out my invention I preferably utilize a trap comprising three separable parts that are combined for convenience in setting, for effective operation in humanely trapping the animal, and for facility in releasing and reclaiming the victim. To this end the invention includes a box or housing, a trigger release mechanism, and a spring-actuated shackle consisting of two pivoted or hinged and bowed bars which when closed form a shackle about the neck of the victim.

The invention consists in certain novel features of construction and combinations and arrangements of parts as will hereinafter be described, and more specifically set forth in the appended claims. In the accompanying drawings I have illustrated one complete example of the physical embodiment of my invention in which the parts are combined and arranged in accord with one mode I have devised for the practical application of the principles of my invention. It will however, be understood that changes and alterations are contemplated, and may be made in these exemplifying drawings and mechanical structures, within the scope of my claims, without departing from the principles of my invention.

Figure 1 is a vertical longitudinal sectional view through a box or housing disclosing the trigger release and baited mechanism, together with the trapping shackle mechanism in open or set position, and showing an anchoring stake and chain to prevent the trapped victim from carrying away the trap.

Figure 2 is a view in front elevation of the trap structure of Fig. 1 with the trap set and baited.

Figure 3:
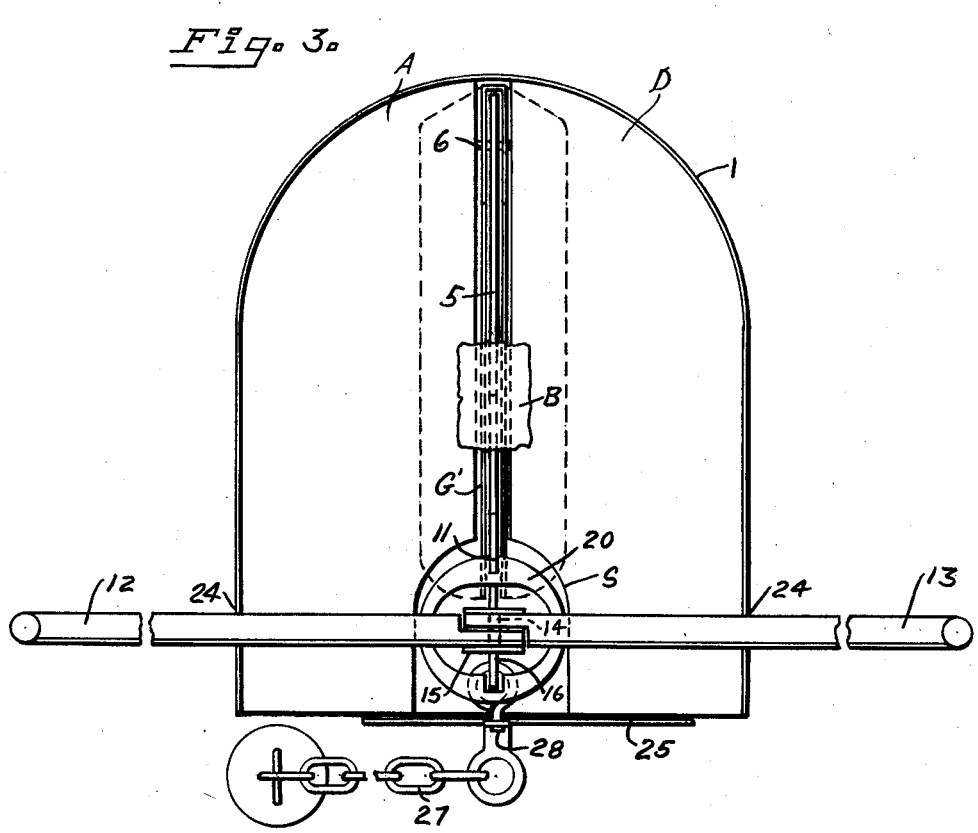
Figure 3 is a top plan view of the trap structure of Fig. 2.
Figure 4:
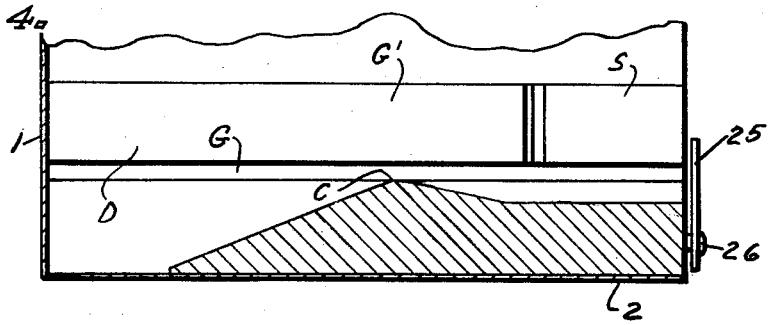
Figure 4 is a detail vertical longitudinal sectional view through the box or housing showing especially the bottom construction for the reception of the trigger-release mechanism.
Figure 5:
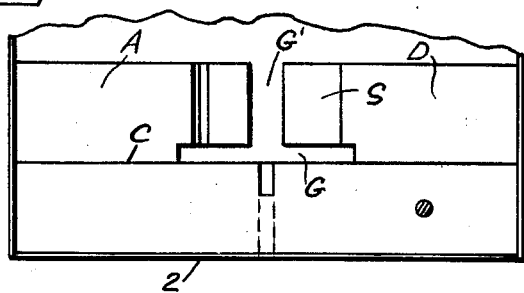
Figure 5 is a detail view in front elevation of the box structure disclosed in Fig. 4.
Figure 6:
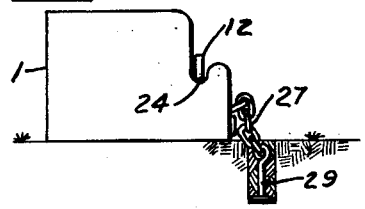
Figure 6 is a side elevation on a reduced scale illustrating the trap structure, in set position.
Figure 7:
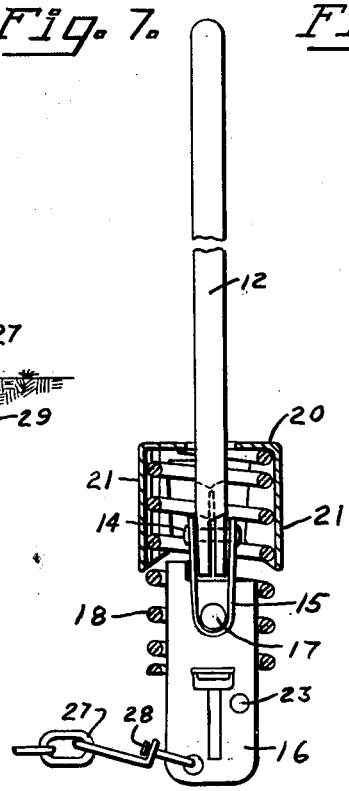
Figure 7 is a detail view partly in section at one side of the shackle structure, in closed position.

Of the three separable parts of the trap structure the housing or box 1 may be constructed of suitable material, size, and shape, and as here shown it is open at the top and front and provided with a rounded rear end, and the floor or bottom 2 is provided with angular upper faces that terminate in a crown portion C. As best seen in Figs. 4 and 5 a T-shaped slot is provided by a two part member A and D comprising a central longitudinally and horizontally extending groove G, located just above the floor or bottom 2, and a vertical slot or groove G' which opens upwardly from the groove or slot G. The walls of the vertical slot G' spread outwardly at the front of the box to form a socket portion S.

This arrangement of parts in the bottom of the box is designed for the reception of the equipment for the bait and trigger-release mechanism that includes a metallic two-walled frame 3 made of plates that are retained in spaced relation to each other by a triangular shaped spacing member 3' that is secured to the plates by means of the fastener 3''. The plates are fashioned with a base flange 4. This frame, of inverted T-shape, is adapted to be slipped into the slotted and grooved bottom portion of the box as indicated in the drawings, and the upright frame provides a holder for the bait-arm 5 which is pivoted at 6 in the frame 3. The forward end of the pivoted bait arm is pointed to receive the bait B (as a piece of carrot for a rabbit) and as indicated in Fig. 1 the bait is supported in elevated position where it is readily accessible to the animal through the open top and front of the box.

The pivoted bait arm or trip-lever 5 is of angular shape and provided with a lug 7 which co-acts with a complementary detent 8 of a trigger 9 that extends forwardly toward the front of the box where it is pivoted at 10 in the frame 3. The trigger terminates in an upright arm that has a forwardly projecting finger or retaining detent 11 that projects over the socket portion S of the box-bottom in which the shackle assembly is separably mounted.

This assembly includes an imprisoning shackle or pivoted sectional yoke that is designed to snap around the neck of the animal as he reaches over the assembly and endeavors to remove the bait from the bait arm. In his endeavors the rabbit trips the lever 5, releases the trigger 9, and the retaining detent 11 is withdrawn from the set shackle assembly, thereby permitting the yoke or shackle to automatically close about the neck of the animal, and imprison him until called for by the trapper.

The shackle or yoke includes a pair of bowed bars or jaws 12 and 13 that are pivoted together on a pin 14 within a U-shaped clevis 15, and when spread apart in set position, these jaws are released by withdrawal of the detaining finger 11. The clevis 15, which is slotted at its lower bent end is coupled to a flat, upright, vertically disposed base plate 16, and the slotted clevis straddles the upper end of the plate and is retained by a coupling pin 17 that extends transversely of the plate and is seated in the bent end of the clevis.

For use in setting and snapping the trap a depressible coiled spring 18 encloses the U-shaped clevis, the jointed or pivoted ends of the bows or bars of the shackle when the shackle is in closed position, and the upper portion of the base plate; and the spring is interposed between a lower fixed support 19 that is mounted transversely in the base plate, and an upper depressible cap 20. The cap is mounted over the top of the spring and the top of the cap is open to accommodate the bows 12 and 13 of the yoke, while a pair of side flanges 21 of the cap extend down alongside the spring to retain the cap in proper position.

Figure 8:
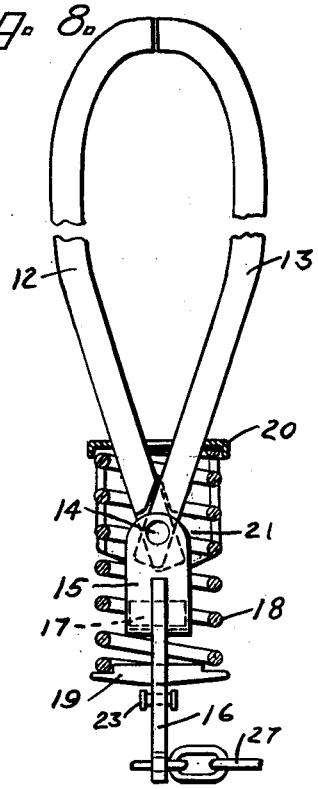
Figure 8 is a front elevation of the parts in Fig. 7 with parts in section.
Figure 9:
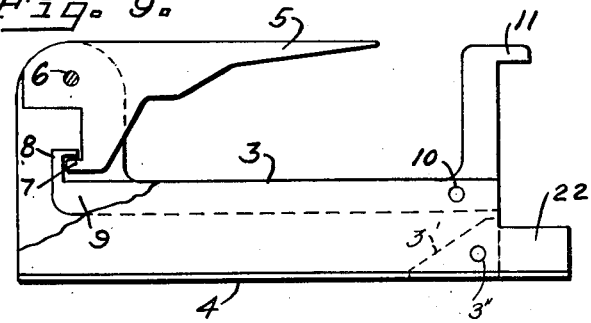
Figure 9 is a side elevation of the baiting device or trigger-release mechanism.
Figure 10:
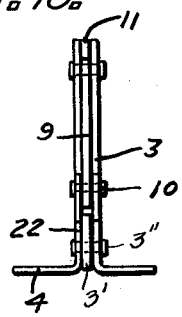
Figure 10 is a view in elevation as seen from the right in Fig. 9.

Preferably the shackle is set before the shackle assembly is mounted in the box, and by spreading the arms or bows 12, 13 in Fig. 8 to open or set position in Fig. 2, the two bars 12 and 13 in cam engagement with the open top cap, depress the cap and the spring against the fixed support 19.

While in this set position the shackle assembly is attached to the socket portion of the front of the box, and operatively combined with the trigger-release mechanism that has previously been mounted in the trap box. In mounting the shackle assembly in the trap box the base plate 16 is slipped in between the spaced plates of an extension 22 of the frame 3, and a retaining pin 23 of the base plate co-acts with the spaced plates of the extension 22 in holding the depressed assembly in the socket portion S of the bottom of the box. The outspreading arms or bars of the shackle or yoke are fitted into notches 24 in the opposite side walls of the box 1; and the shackle assembly may further be retained in the front of the box by means of a spring blade or keeper 25 that is secured on the front wall of the floor of the box by a screw 26, and this keeper may be turned on the screw as a center, to permit withdrawal of the shackle assembly when desired.

As the rabbit reaches over the shackle assembly and grasps the bait B in its mouth, and then tries to carry away the bait, the trigger mechanism releases the open yoke or shackle as before described as the compressed spring 18 and depressed cap 20 snap upwardly, and by cam action of the open cap the jaws or bars of the shackle are closed about the neck of the rabbit.

Preferably, the trap, or the shackle assembly, is anchored so that the assembly cannot be carried away by the imprisoned animal, and for this purpose an anchoring chain 27 is connected by a swivel joint 28 to the base plate 16, and an anchoring stake 29 may be driven in the ground to prevent removal of the shackle assembly.

Having thus fully described my invention, what I claim as new and desire to secure by Letters Patent is:

1. In an animal trap having a trap box provided with an open top and front, and a closed bottom having a two part member therein provided with an attaching T-shaped slot, the improvement comprising, a T-shaped frame receivable in the similarly shaped slot in the two part member, a bait arm pivoted in said T-shaped frame, a trigger pivotally mounted in said T-shaped frame, a lug on said bait arm and a detent on one end of said trigger adapted to coact with each other to retain said bait arm in elevated relation to said frame, a second detent on the opposite end of said trigger, and a separable shackle assembly having a depressed spring actuated means mounted in the trap box for engagement with said second detent whereby said shackle assembly is retained in set position until said bait arm is moved to disengage the lug thereon from the detent on said trigger and said shackle assembly comprising a base plate, a pair of animal enclosing arms pivoted to the upper end of the base plate and said base plate being positioned in said closed bottom so that the said second detent will engage said spring actuating means.

2. The improvement as in claim 1 wherein means is provided on said shackle assembly for coaction with said trigger for setting said shackle assembly.

3. The improvement as in claim 1, wherein a cap is provided on said shackle assembly which coacting with said second detent retains the shackle assembly in open set position.

WILLIAM R. LAZENBY.

REFERENCES CITED

The following references are of record in the file of this patent:

UNITED STATES PATENTS

| Number | Name | Date |
|---|---|---|
| 412,499 | Hamilton | Oct. 8, 1889 |
| 830,284 | Barry | Sept. 4, 1906 |
| 929,147 | Lund | July 27, 1909 |
| 1,442,385 | Cratty | Jan. 16, 1923 |
| 1,466,332 | Crago | Aug. 28, 1923 |
| 1,709,144 | Mueller | Apr. 16, 1929 |
| 1,865,044 | Polaire | June 28, 1932 |
| 2,416,481 | Hollenbeck | Feb. 25, 1947 |